United States Patent
Lucarelli et al.

(10) Patent No.: US 6,340,402 B1
(45) Date of Patent: Jan. 22, 2002

(54) FILTERS

(75) Inventors: Cesare Lucarelli, deceased, late of Leicester (GB), by Jennifer Mary Lucarelli, executrix; Brett Halpin, Pompton Lakes, NJ (US)

(73) Assignee: Microtech Filters Limited (GB)

( * ) Notice: Subject to any disclaimer, the term of this patent is extended or adjusted under 35 U.S.C. 154(b) by 0 days.

(21) Appl. No.: 09/232,563

(22) Filed: Jan. 15, 1999

(Under 37 CFR 1.47)

(30) Foreign Application Priority Data

Jan. 16, 1998 (GB) .............................. 9800831

(51) Int. Cl.$^7$ .................. B32B 31/00; A62B 13/00; B01D 35/30
(52) U.S. Cl. .................. 156/92; 156/281; 156/295; 156/308.4; 55/DIG. 5
(58) Field of Search .................. 156/91, 92, 281, 156/292, 295, 308.4, 326, 327, 330, 69; 55/DIG. 5; 210/450, 497.01, 488

(56) References Cited

U.S. PATENT DOCUMENTS

| 3,528,557 A | | 9/1970 | Luchetta |
|---|---|---|---|
| 3,996,409 A | * | 12/1976 | Holloway et al. |
| 4,533,422 A | * | 8/1985 | Litke |
| 4,725,323 A | | 2/1988 | Ostreicher et al. |
| 5,580,456 A | * | 12/1996 | Bowlsbey |
| 5,711,878 A | * | 1/1998 | Ogata et al. |
| 5,714,030 A | * | 2/1998 | Kitamura et al. |

FOREIGN PATENT DOCUMENTS

GB 1570385 7/1980

* cited by examiner

Primary Examiner—Curtis Mayes
(74) Attorney, Agent, or Firm—Nixon Peabody LLP

(57) ABSTRACT

A method of assembly of a NBC Filter comprising a tubular formation of an inner filter medium closed at lease one end by a metallic inner end cap, a tubular mass of granulated carbon surrounding said inner filter medium to form an outer filter medium, a tubular mesh enclosing said outer filter medium, an annular, resilient gasket surrounding said inner end cap and an outer end cap of metallic material having a peripheral skirt which, in use, surrounds one end of the mesh tube while the gasket is compressed between the outer end cap and the carbon mass. A thixotropic adhesive is interposed between the inner periphery of the gasket and the inner end cap, between the outer periphery of the gasket and mesh tube and between the gasket and the outer end cap.

3 Claims, 1 Drawing Sheet

FILTERS

Figure 1:
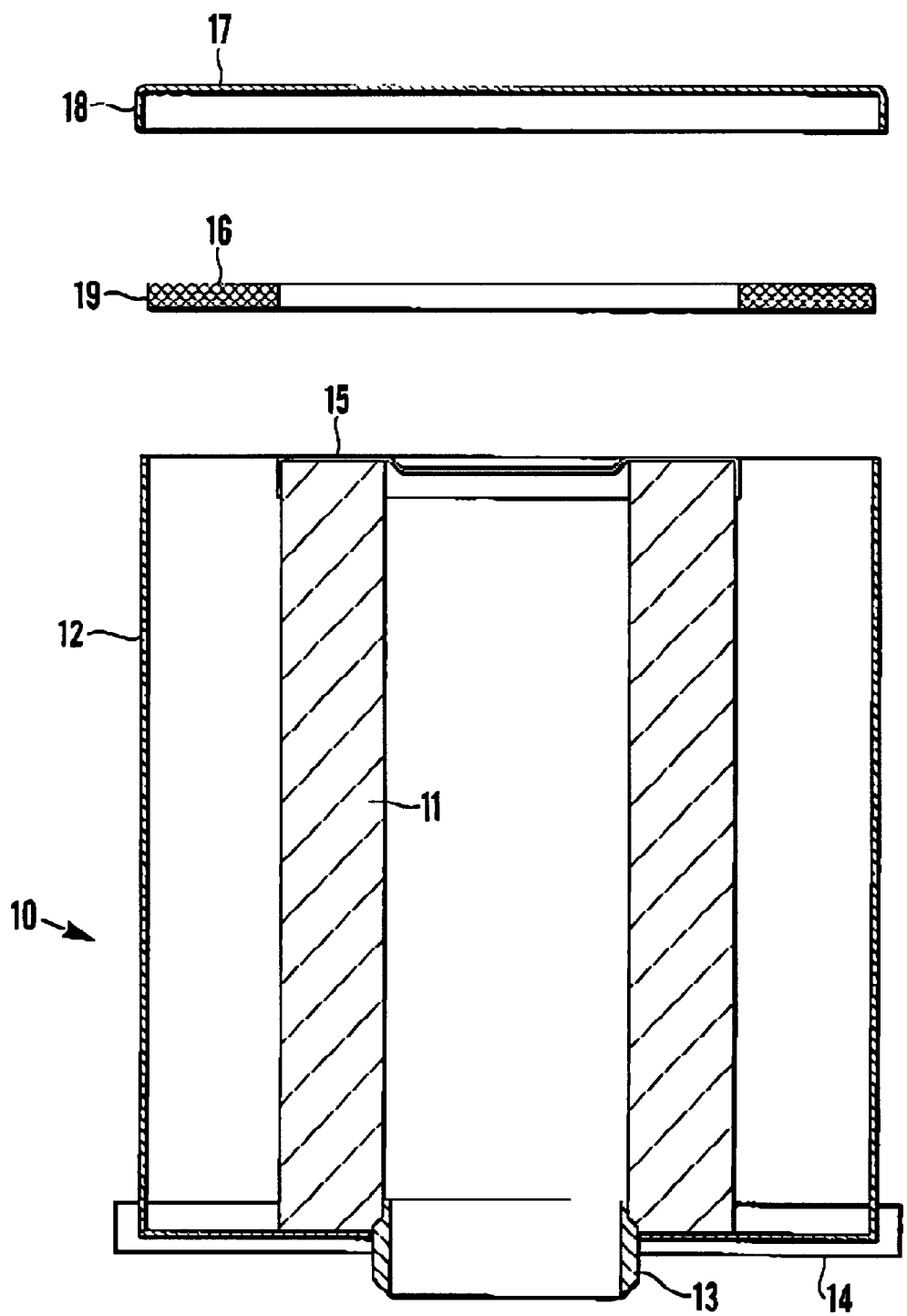

This invention relates to improvements in filters, and more particularly to improvements in so-called "Nuclear, Biological and Chemical" (NBC) Filters which comprise a tube of pleated filter material surrounded by particulate carbon in turn surrounded by a petal mesh. Ambient air drawn into the interior of the tube at one end is discharged through the mesh into an enclosure such as the interior of a ship, having undergone filtration to remove toxic substances. Such filters are used, for example in ships or bunkers, to protect the occupants in the event of nuclear, biological or chemical attack.

Although filters of this kind have been in use for about 30 years no satisfactory solution has hitherto been found to the problem that leakage of the particulate carbon can occur particularly at the junction of the tube of metal mesh with a metal end cap used to close it. The end cap is formed with a peripheral flange or skirt which surrounds said end of the mesh tube and may be riveted to it, but carbon particles may nevertheless escape. Conventionally a resilient gasket is pressed onto the carbon particles when the end cap is fitted, but rough handling of the filter e.g. during transport or testing may cause compaction and powdering of the carbon granules in turn leading to voids within the carbon mass which will reduce the sealing efficiency of the gasket, and subsequent failure of the filter.

A principal object of the present invention is to provide an improved filter and method of assembling the same.

In accordance with one aspect of the present invention there is provided a method of assembly of a NBC Filter comprising a tubular formation of an inner filter medium closed at at least one end by a metallic inner end cap, a tubular mass of graulated carbon surrounding said inner filter medium to from an outer filter medium, a tubular mesh enclosing said outer filter medium, a annular, resilient gasket surrounding said inner end cap and an outer end cap of metallic material having a peripheral skirt which, in use, surrounds one end of the mesh tube while the gasket is compressed between the outer end cap and the carbon mass, the method comprising interposing a thixotropic adhesive between the inner periphery of the gasket and the inner end cap, between the outer periphery of the gasket and the mesh tube and between the gasket and the outer end cap.

Preferably a continuous bead of said adhesive is applied to the gasket while the latter is in an unstressed condition and where the latter projects from the mesh tube before the outer end cap is brought to compress the gasket with its skirt surrounding and riveted to the mesh tube.

The adhesive used is preferably MIL-A-46146B, Group II, Type 1, such as that known as "Loctite 5145".

Preferably the outer surface of the inner end cap and the inner surface of the outer end cap are first sand-blasted and then cleaned prior to contact with the adhesive.

A preferred embodiment of the invention will now be described by way of example with reference to the accompanying Drawing, FIG. 1, which is an exploded sectional elevation of a NBC filter.

The NBC filter 10 illustrated comprises a tubular formation 11 of pleated cellulose paper impregnated and/or coated with microfibre glass. This is surrounded in spaced relation by a perforated metal housing or mesh tube 12 backed by a fine fabric scrim (not shown). The annular space between the mesh 12 and inner filter medium 11 is filled with a loose mass of granulated carbon (not shown). At one end of the filter (the lower as shown) a socket 13 permits the admission to the interior of the tube 11 of air rom outside the enclosure from, cabin or the like) being protected by the filter. A lower end cap 14 surrounds socket 13 and closes off the bottom end of the formation 11 and the lower end of the space between it and the housing 12.

At the upper end of the filter a metallic, inner end cap is closes the top end of the formation 11. An annular gasket 16 of resilient material, such as Neoprene rubber, is located on the tubular mass of carbon granules so that in its unstressed condition it projects slightly from the tubes 11 and 12. The gasket 16 is compressed when an outer end cap 17 of a metallic material is now brought down until its peripheral skirt 18 surrounds the upper end of the housing 12. Rivets (not shown) may now be used to secure the skirt 18 of the outer end cap to the housing 12.

As so far described the filter is known. In accordance with the present invention, however, prior to compression of the gasket 16 by the outer end cap 17 a continuous bead of a thixotropic adhesive is applied to a surface of the gasket 16 exposed from the carbon granules, for example a peripheral region of its upper surface as show so that when the outer end cap 17 is brought to compress the gasket there will be adhesive between the outer periphery 19 of the gasket and both the inner surface of the skirt 18 of the outer end cap and the outer surface of the metal mesh 12.

Preferably there is also adhesive between the inner periphery of the gasket 16 and the outer surface of the inner end cap 15.

Prior to assembly of the filter 10 the outer surface of the inner end cap 15 and the inner surface of the outer end cap 17 have been first sand-blasted and then cleaned to promote bond with the adhesive. The adhesive used is preferably MIL-A-46146B, Group II, Type 1, such as that known as "Loctite 5145".

During assembly and before the adhesive cures the latter will serve as a lubricant and it will fill any voids between the mesh the gasket and the outer end cap. After cure the adhesive will provide a seal against the escape of carbon powder but will retain sufficient resilience to allow the gasket to unction as in prior art filters.

What is claimed is:

1. A method of assembly of a NBC filter comprising a tubular formation of an inner filter medium closed at at least one end by a metallic inner end cap having a first peripheral skirt, a tubular mass of granulated carbon surrounding said inner filter medium to form an outer filter medium, a mesh tube enclosing said outer filter medium, an annular, resilient gasket surrounding said inner end cap and an outer end cap of metallic material having a second peripheral skirt which, in use, surrounds one end of the mesh tube while the gasket is compressed between the outer end cap and the carbon mass, the method comprising interposing a thixotropic adhesive between the inner periphery of the gasket and the first peripheral skirt of the inner end cap, between the outer periphery of the gasket and mesh tube and between the gasket and the outer end cap, and allowing said adhesive to cure, wherein during assembly and before said adhesive cures said adhesive fills any voids between said mesh tube, said gasket and said outer end cap, and after curing said adhesive provides a seal against escape of particulate matter from said carbon mass but retains sufficient resilience to allow said gasket to function, and wherein said adhesive does not bond said inner filter medium to said inner end cap.

2. A method according to claim 1 wherein a continuous bead of said adhesive is applied to the gasket while the latter is in an unstressed condition and where the latter projects from the mesh tube before the outer end cap is brought to compress the gasket with its skirt surrounding and riveted to the mesh tube.

3. A method according to claim 1 wherein the outer surface of the inner end cap and the inner surface of the outer end cap are first sand-blasted and the cleaned prior to contact with the adhesive.

* * * * *